US007037362B2

(12) United States Patent
Honma et al.

(10) Patent No.: US 7,037,362 B2
(45) Date of Patent: May 2, 2006

(54) WATER COLOR INK FOR INK JET RECORDING

(75) Inventors: Kaori Honma, Kanagawa (JP); Yoshinori Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 17 days.

(21) Appl. No.: 10/472,778

(22) PCT Filed: Feb. 6, 2003

(86) PCT No.: PCT/JP03/01257

§ 371 (c)(1), (2), (4) Date: Sep. 24, 2003

(87) PCT Pub. No.: WO03/066758

PCT Pub. Date: Aug. 14, 2003

(65) Prior Publication Data

US 2004/0103815 A1 Jun. 3, 2004

(30) Foreign Application Priority Data

Feb. 8, 2002 (JP) ....................................... 2002-032873

(51) Int. Cl.
*C09D 11/02* (2006.01)

(52) U.S. Cl. .................................................... 106/31.13

(58) Field of Classification Search ............... 106/31.13
See application file for complete search history.

(56) References Cited

U.S. PATENT DOCUMENTS

| | | | |
|---|---|---|---|
| 5,156,675 A | 10/1992 | Breton et al. | |
| 5,952,414 A | 9/1999 | Noguchi et al. | |
| 6,299,675 B1 * | 10/2001 | Ono et al. | 106/31.27 |
| 2003/0107631 A1 * | 6/2003 | Goto et al. | 347/100 |

FOREIGN PATENT DOCUMENTS

| | | |
|---|---|---|
| EP | 1010735 A1 | 6/2000 |
| JP | 58-049763 | 3/1983 |
| JP | 58-185665 | 10/1983 |
| JP | 58-222163 | 12/1983 |
| JP | 61-043674 | 3/1986 |
| JP | 62-232473 | 10/1987 |
| JP | 2000-160072 A | 6/2000 |
| JP | 2000-178489 A | 6/2000 |
| JP | 2000-256592 A | 9/2000 |
| JP | 2001-115069 A | 4/2001 |

* cited by examiner

*Primary Examiner*—J. A. Lorengo
*Assistant Examiner*—Veronica F. Faison
(74) *Attorney, Agent, or Firm*—Robert J. Depke; Trexler, Bushnelll, Blackstone, Giangiorgi & Marr

(57) ABSTRACT

The present invention is relative with a water color ink suited for ink jet printing for plain paper. The dry viscosity, the dynamic surface tension at 10 ms and the dynamic surface tension at 1000 ms of the ink are prescribed to be equal to 100 mPa·s or less, equal to 45 mN/m or higher and equal to 35 mN/m or less to provide for reduced bleeding and superior drying performance and emission reliability.

3 Claims, 1 Drawing Sheet

WATER COLOR INK FOR INK JET RECORDING

TECHNICAL FIELD

This invention relates to an ink for ink jet recording and, more particularly, to a water color ink for ink jet printing exhibiting superior printing amenability for plain paper. This application claims priority of Japanese Patent Application No. 2002-032873, filed on Feb. 8, 2002, the entirety of which is incorporated by reference herein.

BACKGROUND ART

Recently, an ink jet printer is finding widespread application because of its advantages such as low noise or low running cost. In particular, as the personal computer has come into widespread use, the tendency has become evident that an individual client prints data, such as reports, stored in a computer, are printed by the ink jet printer, with the result that the ink jet printer is used in a number of cases as a substitute for a color copying machine. Thus, printing amenability of the ink jet printer for the plain paper represents one of the crucial properties as an article of commerce.

With the ink jet printer, it is difficult to meet all of variable properties, such as drying properties, feathering, bleeding, color bleed or emitting properties simultaneously. For example, as disclosed in Japanese Laying-Open Patent Publication S55-29546, if ink permeability is increased in photographic paper, considerable bleeding occurs. In order to overcome this drawback, it has been attempted to add an additive to the ink to improve the drying properties. The Japanese Laying-Open Patent Publication S60-23793 states that dialkylsupfosuccinic acid is able to improve the drying properties of ink. However, the drying properties achieved differ from one paper sort to another, while preservability is not optimum. On the other hand, the Japanese Laying-Open Patent Publication H1-203483 discloses the use of a recording liquid containing polyhydric alcohol derivatives and pectin. This recording liquid is also not optimum in reliability because pectin is nonionic.

DISCLOSURE OF THE INVENTION

It is therefore an object of the present invention to overcome the inconvenience inherent in the ink proposed up to now and provide a water color ink which is superior in drying performance, susceptible to bleeding only to a lesser extent, high in emitting reliability and which in particular suited to ink jet recording for plain paper.

For accomplishing the object, the present invention provides a water color ink for ink jet printing in which the dry viscosity is equal to 100 mPa·s or less, the dynamic surface tension at 10 ms is equal to 45 mN/m or higher and the dynamic surface tension at 1000 ms is equal to 35 mN/m or less.

The water color ink for ink jet recording, according to the present invention, in which the dry viscosity and dynamic surface tension are prescribed as defined above, is superior in drying performance, less prone to bleeding and high in emission reliability.

BEST MODE FOR CARRYING OUT THE INVENTION

Figure 1:
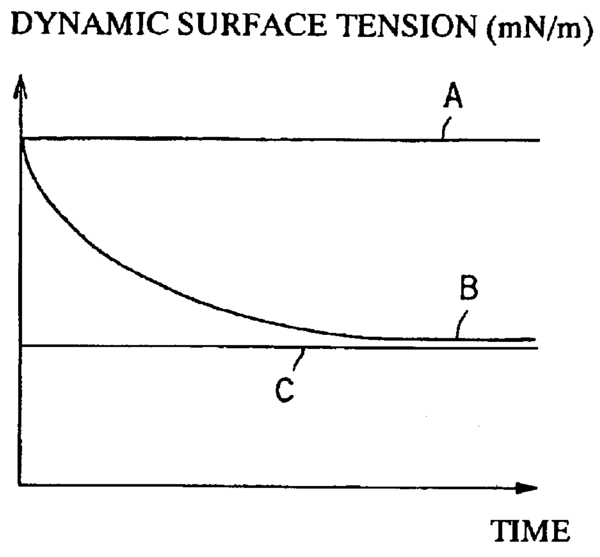
FIG. 1 shows a profile of water color ink.

In the following, several Examples of the present invention are explained.

The water color ink according to the present invention is a water color ink for ink jet recording, at least containing a colorant and a surfactant, with the dry viscosity of the ink being 100 mPa·s or less, the dynamic surface tension at 10 ms being 45 mN/m or higher and with the dynamic surface tension at 1000 ms being 35 mN/m or less.

It has been found that the dry viscosity of the ink is crucial in connection with reliability, in particular emission characteristics of the ink. As for the dry viscosity of the ink, ink is charged into a cup 30 mm in diameter, and allowed to stand in an atmosphere of a temperature of 25° C. and a relative humidity of 50%, and time dependency of the viscosity is checked. The viscosity is increased as time elapses. The rate of increase in the viscosity becomes dull as from a certain viscosity until it is substantially constant. This constant value is used as dry viscosity. If this dry viscosity exceeds 100 mPa·s, the ink can hardly be emitted.

It has now been found that the dynamic surface tension plays a crucial role on ink bleeding and permeability. The dynamic surface tension, which is the surface tension in a minute length of time, is measured by a bubble pressure method. It is noted that the usual surface tension is measured in a longer length of time of 1000 to 2000 ms and does not represent the surface tension in a minute length of time. It may be conjectured that ink absorption occurs within a time of the order of milliseconds and that the surface tension at this time has something to do with permeability and bleeding.

Referring to FIG. 1, showing a typical ink profile, A depicts the surface tension which is extremely high and is 10 to 1000 ms, B denotes the surface tension which is extremely high at 10 ms and which decays extremely acutely with lapse of time, and C denotes the surface tension which is similar to A but continues to be of a lower value. As may be seen from the profile shown in FIG. 1, A is extremely poor in permeability, B is satisfactory in both permeability and bleeding and C is satisfactory in permeability but susceptible to bleeding. Thus, it has been found that, in order to achieve both high permeability and reduced bleeding simultaneously, the profile such as that of B is desired.

As a result of search into this profile, it has been found that, as for the surface tension at 10 ms, the surface tension equal to 45 mN/m or higher is desirable, while bleeding becomes outstanding for the surface tension less than 45 mN/m, with the surface tension 50 mN/m being more desirable, and that, as for the surface tension at 1000 ms, the surface tension of 35 mN/m or less is desirable, while permeability becomes poor for the surface tension higher than 35 mN/m, with the drying performance being also poor. That is, if an ink is low in dry viscosity and is of the profile of the surface tension as described above, the ink is superior in drying performance and low in bleeding, while being satisfactory in emitting performance.

The water color ink of the present invention preferably has a pH of 8 to 11. If the pH is on the acidic side of lower than 8, the sizing agent cannot be dissolved, the permeability becomes poor and bleeding is likely to be produced, if the pH is higher than 11, the ink may affect the skin of a user when the user's hand touches the ink.

The water color ink of the present invention uses water as a vehicle. However, in order to achieve desirable physical properties of the ink, to prevent the ink from drying or to improve stability of the compound, the following water-soluble organic solvents may be used.

That is, these water-soluble organic solvents may be enumerated by polyhydric alcohols, such as ethylene glycol, diethylene glycol, triethyleneglycol, polyethylene glycol, polypropylene glycol, 1,5-pentanediol, 1,6-hexanediol, glycerine, 1,2,6-hexanetriol, 1,2,4-butanetriol, 1,2,3-butanetriol or petriol, polyhydric alcohol alkylethers, such as ethylene glycol monoethylether, ethylene glycol monobutylether, diethylene glycol monomethylether, diethylene glycol monoethylether, diethylene glycol monobutylether, tetraethylene glycol monomethylether, or propylene glycol monoethylether, polyhydric alcohol arylethers, such as ethylene glycol monophenylether or ethylene glycol monobenzylether, nitrogen-containing heterocyclic compounds, such as N-methyl-2-pyrrolidone, N-hydroxyethyl-2-pyrrolidone, 1,3-dimethyl imidazolidinone, ε-caprolactam or γ-bytyrolactone, amides, such as formamide, -methyl formamide or N,N-dimethyl formamide, amines, such as monoethanolamine, diethanolamine, triethanolamine, monoethylamine, diethylamine or triethylamine, sulfur-containing compounds, such as dimethyl solfoxde, sulforan or thiodiethanol, propylene carbonate and ethylene carbonate. These solvents may be used, along with water, either alone or in combination.

Of these, diethylene glycol, thiodiethanol, polyethyleneglycol 200 to 600, triethylene glycol, glycerin, 1,2,6-hexanetriol, 1,2,4-butanetriol, petriol, 1,5-pentadiol, -methyl-2-pyrrolidone and N-hydroxy diethyl pyrrolidone are preferable. By using these organic solvents, a high solubility of the present compound and a superior effect in preventing the lowering of the ejection properties, otherwise caused by evaporation of moisture, may be achieved.

The penetration agents, used in the present invention in adjusting the surface tension, may be enumerated by alkyl and aryl ethers of polyhydric alcohols, such as diethyleneglycol monophenylether, ethyleneglycol monophenylether, ethyleneglycol monoarylether, diethyleneglycol monobutylether, propylene glycol monobutylether, or tetraethyleneglycol chlorophenylether, fluorine-based surfactants, and lower alcohols, such as ethanol or 2-propanol. Of these, diethyleneglycol monobutylether is most preferred.

As the colorants, used in the present invention, a dye containing a base for a carboxylic acid, becoming difficultly soluble in water at a pH equal to 4 or less, may be used alone or in combination with other dyes. These dyes, used for mixing, may be a dye classified under acidic dyes, direct dyes, basic dyes, reactive dyes and edible dyes in the color index, and which exhibits water proofing properties and light fastness. These dyes may be enumerated as follows:

<Acidic and Edible Dyes>

C.I. Acid Yellow 17, 23, 42, 44, 79, 142

C.I. Acid Red 1, 8, 13, 14, 18, 26, 27, 35, 37, 42, 52, 82, 87, 89, 92, 97, 106, 111, 114, 115, 134, 186, 249, 254, 289

C.I. Acid Blue 9, 29, 45, 92, 249

C.I. Acid Black 1, 2, 7, 24, 26, 94

C.I. Acid Yellow 3, 4

C.I. Food red 7, 9, 14

C.I. Food Black 1, 2

<As Direct Dyes>

C.I. Direct Yellow 1, 12, 24, 26, 33, 44, 50, 120, 132, 142, 144, 86

C.I. Direct Red 1, 4, 9, 13, 17, 20, 28, 31, 39, 80, 81, 83, 89, 225, 227

C.I. Direct Orange 26, 29, 62, 102

C.I. Direct Blue 1, 2, 6, 15, 22, 25, 71, 76, 79, 86, 87, 90, 98, 163, 165, 199, 202

C.I. Direct Black 19, 22, 32, 38, 51, 56, 71, 74, 75, 77, 154, 168, 171

<As Basic Dyes>

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155

C.I. Basic Black 2, 8

<As Reactive Dyes>

C.I. Reactive Black 3, 4, 7, 11, 12, 17

C.I. Reactive Yellow 1, 5, 11, 13, 14, 20, 21, 22, 25, 40, 47, 51, 55, 65, 67

C.I. Reactive Red 1, 14, 17, 25, 26, 32, 37, 44, 46, 55, 60, 66, 74, 79, 96, 97

C.I. Reactive Blue 1, 2, 7, 14, 15, 23, 32, 35, 38, 41, 63, 80, 95

Of the above dyes, acidic dyes and direct dyes are most preferred.

The pigments used may be organic pigments, such as azo-, phtalocyanine-, anrthraquinone-, quinacridone-, dioxadine-, indigo-, thioindigo-, perylene-, isoindolenone-based pigments, aniline black, azo methin based pigments, rhodamine B lake pigments, and carbon black, or inorganic pigments, such as iron oxide, titanium oxide, calcium carbonate, barium sulfate, aluminum hydroxide, barium yellow, ultramarine, cadmium red, chrome yellow and metal powders.

The pigment dispersants may be enumerated by hydrophilic high polymers, which may be natural or artificial products. Examples of the natural products include vegetable high molecuinterviewlar materials, such as gum arabic, tragacanth gum, Goor gum, karaya gum, locust bean gum, arabinogalactone, pectin, or quince seed starch, marine algae based high polymers, such as alginic acid, carrageen or agar-agar, animal high polymers, such as gelatine, casein, albumine or collagen, microbial high polymers, such as xanthene gum or dextran. Examples of the artificial products include semisynthetic high polymers, such as fibrous high polymers, e.g. methyl cellulose, ethyl cellulose, hydroxyethyl cellulose, hydroxy propyl cellulose, or carboxy methyl cellulose, starch-based high polymers, such as sodium starch glycolate, or sodium starch phosphate, and marine algae based high polymers, such as sodium alginate or propylene glycol alginate, and pure synthetic high polymers, such as vinyl high polymers, e.g. polyvinylalcohol, polyvinylpyrrolidone or polyvinyl methyl ether, non-cross-linked polyacrylic amide, polyacrylic acid and alkali metal salts thereof, acrylic resins, such as water-soluble styrene acrylic resin, water-soluble styrene maleic acid resin, water-soluble vinyl naphthalene acrylic acid, water-soluble vinyl naphthalene maleic acid, polyvinyl pyrrolidone, polyvinyl alcohol, alkali metal salts of β-naphthalene sulfonic acid formalin condensates, high polymer compounds having salts of cationic functional groups, such as quartanary ammonium or amino group, on side chains thereof, and natural high polymer compounds, such as shellac.

The water color ink of the present invention may be added by known additives, in addition to colorants and solvents different from the above-mentioned indispensable dyes. As antiseptics and mildew proofing agents, sodium dehydroacetate, sodium solbate, 2-pyridinethiol-1-oxide sodium, sodium benzoate and pentachloro phenol sodium, for example, may be used.

As pH-controllers, amines, such as diethanolamine or triethanolamine, hydroxides of alkali metals, such as lithium hydroxide, sodium hydroxide or potassium hydroxide, ammonium hydroxide, quartanary ammonium hydroxides, quartanary phosphonium hydroxide, or carbonates of alkali metals, such as lithium carbonate, sodium carbonate or potassium carbonate, may be used.

Examples of chelate reagents include sodium ethylenediamine trtraacetate, sodium nitrilo triacetate, sodium hydroxyethyl ethylenediamine triacetate, sodium diethylene triamine pentaacetate, and sodium uramil diacetate. The mildew proofing agents may be enumerated by acidic sulfites, sodium thiosulfate, ammonium thioglycolate, diisopropyl ammonium nitrite, pentaerythrytol tetranitrate, and dicyclohexyl ammonium nitrite. In addition, water-soluble UV absorbers, water-soluble IR absorbers or surfactants may be used as additives.

The water color ink according to the present invention is prescribed to have a dry viscosity of 100 mPa·s or less, a dynamic surface tension at 10 ms of 45 mN/m or higher and a dynamic surface tension at 1000 ms of 35 mN/m or less, and hence is superior in drying properties, prone to bleeding only to a lesser extent, and is high in emission properties. This water color ink is particularly suited to ink jet recording for plain paper.

In the following, certain Examples and Comparative Examples, carried out to confirm the meritorious effect of the present invention, are explained. Although specified compounds and numerical figures are given in the following explanation, the present invention is, of course, not limited to these compounds or numerical figures.

The following ingredients were mixed with water, glycerin, fluorine-based surfactants and DB199 (dyes), agitated at 60° C. and allowed to stand at room temperature. To the resulting product was then added triethanolamine to adjust pH to 9 to prepare the water color ink.

EXAMPLE 1

| | |
|---|---|
| DB199 (dye): | 5 parts by weight |
| ethylene glycol: | 10 parts by weight |
| diethylene glycol: | 10 parts by weight |
| fluorine-based surfactant: | 0.5 part by weight |
| water: | 74 parts by weight |
| triethanolamine: | 0.5 part by weight |

EXAMPLE 2

| | |
|---|---|
| DB199 (dye): | 5 parts by weight |
| glycerin: | 10 parts by weight |
| ethylene glycol: | 5 parts by weight |
| diethylene glycol: | 5 parts by weight |
| polyoxyethylene nonyl pneyl ether (surfactant): | 0.5 part by weight |
| water: | 74 parts by weight |
| triethanolamine (pH adjustment agent): | 0.5 part by weight |

EXAMPLE 3

| | |
|---|---|
| DB199 (dye): | 3 parts by weight |
| ethylene glycol: | 10 parts by weight |
| diethylene glycol: | 10 parts by weight |
| water: | 82 parts by weight |
| triethanolamine: | 0.5 part by weight |
| silicone-based surfactant: | 0.5 part by weight |

COMPARATIVE EXAMPLE 1

| | |
|---|---|
| glycerin (water-soluble solvent): | 10 parts by weight |
| 2-pyrrolidone (water-soluble solvent): | 10 parts by weight |
| DB199 (dye): | 4 parts by weight |
| water: | 75.5 parts by weight |
| triethanolamine (pH adjustment agent): | 0.5 part by weight |

COMPARATIVE EXAMPLE 2

| | |
|---|---|
| glycerin (water-soluble solvent): | 3 part by weight |
| B3E (water-soluble solvent): | 22 parts by weight |
| DB199 (dye): | 4 parts by weight |
| water: | 75.5 parts by weight |
| triethanolamine (pH adjustment agent): | 0.5 part by weight |

COMPARATIVE EXAMPLE 3

| | |
|---|---|
| glycerin (water-soluble solvent): | 20 parts by weight |
| silicone-based surfactant: | 0.5 part by weight |
| DB199 (dye): | 4 parts by weight |
| water: | 85 parts by weight |
| triethanolamine (pH adjustment agent): | 0.5 part by weight |

COMPARATIVE EXAMPLE 4

| | |
|---|---|
| DB199 (dye): | 5 parts by weight |
| glycerin: | 11 parts by weight |
| ethyleneglycol: | 5 parts by weight |
| diethyleneglycol: | 5 parts by weight |
| polyoxyethylene nonylphenylether (surfactant): | 0.5 part by weight |
| water: | 74 parts by weight |
| triethanolamine (pH adjustment agent): | 0.5 part by weight |

COMPARATIVE EXAMPLE 5

| | |
|---|---|
| DB199 (dye): | 3 parts by weight |
| glycerin: | 10 parts by weight |
| tributyl monoethylether: | 10 parts by weight |
| water: | 77 parts by weight |
| triethanolamine (pH adjustment agent): | 0.5 part by weight |

COMPARATIVE EXAMPLE 6

| | |
|---|---|
| DB199 (dye): | 3 parts by weight |
| tributyl monoethylether: | 15 parts by weight |
| water: | 82 parts by weight |
| triethanolamine (pH adjustment agent): | 0.5 part by weight |

Figure 2:
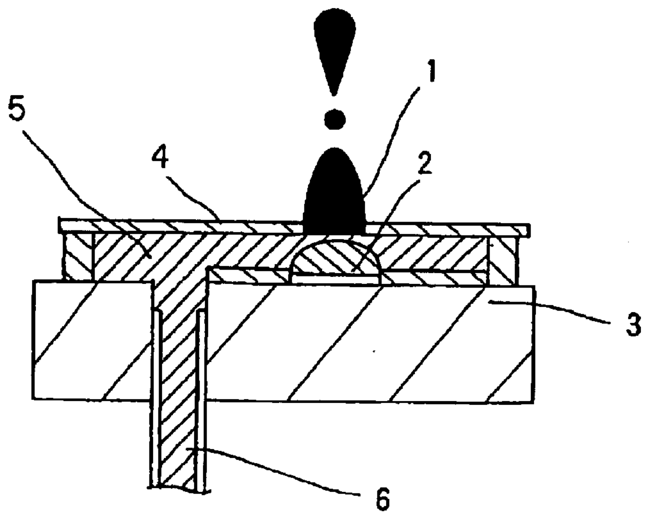
FIG. 2 is a cross-sectional view showing the structure of a printer used for evaluation in Examples.

Of the water color ink, prepared as described above, evaluation was made of drying properties, bleeding, and emission reliability, using an ink jet printer having a 600 dpi nozzle of the thermal inkjet type shown in FIG. 2. This ink jet printer includes an ink emission nozzle 1, a heating device 2, a substrate 3, a nozzle plate 4, an ink liquid chamber 5 and an ink supply duct 6.

For evaluating the drying properties, a plain paper sheet (Ricoh My-Paper NBS) (alkaline paper) was pressured against an as-printed image, under a preset condition, and the time until the ink can no longer be transcribed to the plain paper sheet was measured. When an ink sample dried within ten seconds or in a time exceeding ten seconds, it was evaluated ○ or x, respectively.

In evaluating the bleeding, a preset pattern was printed and the printed state was observed visually. A sample print in which no bleeding occurred was evaluated ○ and another one suffering from bleeding was evaluated x.

In evaluating emission reliability, a printer head was allowed to stand for ten minutes, during its operation, without capping or wiping, at a temperature of 25° C. and at a relative humidity of 50%, and a number of pulses until emission (the number of restoration pulses) was measured. When an ink sample was emitted with less than 1000 pulses or with 1000, or more than 1000 pulses, the ink sample was evaluated ○ or x, respectively.

The dynamic surface tension of an ink sample was measured using Bubble Pressure Tension Meter BP2, manufactured by KRUSS.

As for the dry viscosity, ink was charged into a cup 30 mm in diameter, and allowed to stand in an atmosphere a temperature of 25° C. and at a relative humidity of 50%, and the time dependency of the viscosity was measured.

The following Table 1 shows the results of evaluation of the inks of the Examples and Comparative Examples.

TABLE 1

| | dynamic surface tension: mN/m | | drying | | emission | dry viscosity |
|---|---|---|---|---|---|---|
| | 10 ms | 1000 ms | performance | bleeding | reliability | mPa · s |
| Experimental Example 1 | 50 | 34 | ○ | ○ | ○ | 40 |
| Experimental Example 2 | 46 | 30 | ○ | ○ | ○ | 96 |
| Experimental Example 3 | 49 | 32 | ○ | ○ | ○ | 100 |
| Comparative Example 1 | 65 | 64 | x | ○ | x | 320 |
| Comparative Example 2 | 36 | 35 | ○ | x | ○ | 50 |
| Comparative Example 3 | 54 | 44 | x | ○ | x | 400 |
| Comparative Example 4 | 46 | 29 | ○ | ○ | x | 102 |
| Comparative Example 5 | 39 | 37 | ○ | x | x | 290 |
| Comparative Example 6 | 40 | 39 | x | x | x | 210 |

As may be seen from Table 1, the bleeding performance is not that good with Comparative Examples 2, 5 or 6 where the dynamic surface tension at 10 ms is less than 45 mN/m. In the Comparative Examples 1, 3, 5 and 6, where the dynamic surface tension at 1000 ms is 35 mN/m or higher, permeability is poor, while the drying performance is not that good. In the Comparative Examples 1, 3, 4, 5 and 6, where the dry viscosity is higher than 100 mPa·s, the ink is not liable to be emitted, and hence is poor in emission reliability.

On the contrary, with the ink with the dynamic surface tension at 10 ms of 45 mN/m or higher, the dynamic surface tension at 1000 ms of 35 mN/m or less and with the dry viscosity of 100 mPa·s or less, it may be seen that optimum characteristics have been achieved with any of bleeding properties, drying properties and emission reliability.

The present invention is not limited to the above embodiments elucidated in the foregoing with reference to the drawings, and can be modified by the skilled artisan by correction or substitution of the embodiments within the scope not departing from the purport of the invention.

INDUSTRIAL APPLICABILITY

With the present invention, in which the dry viscosity is equal to 100 mPa·s or less, the dynamic surface tension at 10 ms is equal to 45 mN/m or higher and the dynamic surface tension at 1000 ms is equal to 35 mN/m or less, such an ink may be realized which is less susceptible to bleeding and which is superior in drying performance and emission reliability. This water color ink is particularly suited for ink jet printing for plain paper.

What is claimed is:

1. A water color ink for ink jet recording wherein the dry viscosity is equal to 100 mPa·s of less, the dynamic surface tension at 10 ms is equal to 45 mN/m or higher and the dynamic surface tension at 1000 ms is equal to 35 mN/m or less; and wherein said ink is comprised of:

water and a colorant and one or more water soluble organic solutions.

2. The water color ink for ink jet recording according to claim 1 wherein the pH of the ink is 8 to 11.

3. The water color ink for ink jet recording according to claim 1 wherein the ink is comprised of:

five parts colorant, and
twenty parts water soluble organic solvents, and
one half part of a surfactant, and
seventy-four parts of water, and
one half part an ph adjustment agent.

* * * * *